3,231,389
YEAST LEAVENED PRE-MIX FOR BAKERY PRODUCTS

Elmer J. Cooper and Shao Lin Chen, Milwaukee, Wis., assignors to Universal Foods Corporation, Milwaukee, Wis., a corporation of Wisconsin
No Drawing. Filed June 12, 1963, Ser. No. 287,196
7 Claims. (Cl. 99—94)

This invention relates to the production of yeast leavened bakery products and more particularly to bakery product pre-mixes of yeast leavened cereal flours having enhanced shelf storage stability, and in which the yeast is an integral part of the dry pre-mix.

Generally, conventional commercial and retail pre-mixes for bakery goods, in which the leavening agent is an integral part of the ingredients, have been limited to those using chemical leavening. Such pre-mix compositions, however, have necessarily been restricted to cake, pancake, or similar mixes. It can be appreciated, however, that yeast leavened bakery goods are a class of products which has a particular flavor, texture and consistency which has not and cannot be duplicated by the use of chemical leavening agents.

Pre-mixes for the production of yeast leavened bakery products are articles of commerce but such pre-mixes do not contain the yeast required for leavening as an integral part of the mix. The yeast must either be purchased separately by the baker, institution, or housewife, or it is provided by the pre-mixer, but packaged separately from the other ingredients.

Although yeast leavened bakery products have been likely candidates for pre-mix compositions, commercial yeast products heretofore did not lend themselves to intimate blending with the other ingredients of the pre-mix.

One of the forms of yeast which is sold commercially is known as "compressed yeast." It contains about 75% moisture and is commonly stored, delivered and retailed under refrigerated conditions. Such special handling is necessary since it is known that without refrigeration compressed yeast rapidly loses its activity or viability to such an extent that it becomes unsuitable as a leavening agent and may even be subject to spoilage. Obviously a product of this type cannot be used as an integral part of a dry pre-mix composition.

Another form in which yeast is sold commercially is known as "active dry yeast" (ADY). This yeast is prepared in a dry, granular form by drying extruded compressed yeast under carefully controlled conditions to a moisture content of about 7.5 to 8.5 percent. Although it does not require refrigeration to maintain its activity, ADY must be packaged in the absence of oxygen, that is, in the absence of air. It has been the experience of those working in the yeast field that this is best accomplished by packaging the active dry yeast in hermetically sealed containers under an atmosphere of nitrogen or under vacuum.

Active dry yeast of this type likewise cannot be successfully incorporated into a pre-mix composition since the resulting product has poor storage stability when in contact with air over the periods which such products are likely to remain on the shelf during distribution through sales channels to the retail, commercial or institutional trade.

Accordingly, since yeast leavened bakery goods are a class of products which has a distinguishing and particular flavor, texture and consistency, it can be further appreciated that it would be desirable to provide a yeast leavened bakery product pre-mix composition in which the yeast is an integral component of the pre-mix and which, when used in the preparation of bakery goods, would have all of the characteristics of yeast leavened bakery products prepared by conventional techniques, and would also have the added advantage of a long shelf storage life without the employment of special packaging techniques.

It would also be desirable to provide a pre-mix composition in which the yeast is an integral component of the pre-mix and which would be capable of use in private households as well as in commercial or institutional bakeries.

It would further be desirable to provide pre-mixes of the aforesaid type which would permit the processing of yeast leavened baked goods in a convenient, foolproof and time saving manner as compared to conventional techniques.

In view of the foregoing desideratum, one object of the present invention is the provision of a yeast leavened pre-mix composition for bakery goods.

Another object is the provision of a yeast leavened pre-mix composition for bakery goods in which the yeast is an integral component of the pre-mix and which has a prolonged storage life.

A further object is the provision of a yeast leavened pre-mix composition for bakery goods in which the yeast is an integral component of the pre-mix to thereby eliminate the need for separate handling of said yeast.

A still further object is the provision of a yeast leavened pre-mix composition for bakery goods which does not require a fermentation period or floor time prior to forming of the doughs.

These and other objects of the present invention may be more readily understood by reference to the following specification and appended claims.

Accordingly, in one broad form the present invention comprises a yeast leavened bakery product pre-mix composition containing flour having a moisture content of up to about 10 percent and a stabilized active dry yeast, the said pre-mix having an aggregate moisture content of up to 10 percent.

The flour utilized in the preparation of the composition of the present invention is broadly derived from cereal grains, such as wheat, rye and the like, of which wheat is the most preferred. The wheat flour utilized in the practice of the invention may be either a cake, biscuit or a bread flour, provided the moisture content of such flour does not exceed about 10 percent. The aggregate moisture of the pre-mix composition of all ingredients should likewise not exceed 10 percent by weight.

The gluten content of the flour may vary within the normal ranges, although at least 5 percent gluten is required for a satisfactory yeast leavened bakery product pre-mix composition. For the production of bread, flour with a higher gluten content is preferred, or the gluten content of the pre-mix may be supplemented by the addition of vital wheat gluten to bring the total gluten content of the aggregate flour to from about 13.5 percent to about 25 percent or above. Flour which has been fortified with additional gluten may be used to obtain a high protein bread of superior nutritive properties.

The stabilized active dry yeast used in the present compositions is described in Chen and Cooper U.S. Patent No. 3,041,249 as containing a compound selected from the group consisting of butylated hydroxyanisole, butylated hydroxytoluene and propyl gallate, and having a moisture content of up to about 6 percent. The stabilized active dry yeast is preferably used in amounts of from ½ to 4½ percent by weight. For pre-mix compositions which may be formed into bakery products by a single rise process from 1½ to 4½ percent stabilized active dry yeast is preferred. For use in processes which involve fermentation or floor time prior to forming, from ½ to 1½ percent of stabilized active dry yeast is preferred.

The yeast leavened pre-mix compositions of the present invention may also contain the conventional additives commonly used in the production of bakery goods. These include, for example, sugar, salt, yeast food, malt, milk solids, shortening, softeners, oxidants, and the like. Conventional flour oxidizers include such materials as potassium bromate and iodate, which are preferred, and also the calcium bromate and iodate. The potassium bromate is conventionally used in an amount of from 10 to 75 parts per million, while potassium iodate is used in somewhat smaller amounts, such as for example, 5 to 50 p.p.m.

The salt used in the pre-mix formulations is in amounts conventional for this application, specifically, from 1 to 3 percent and preferably from 1 to 2 percent. Sugar likewise should be used in an amount to provide sufficient nutrient for the fermentation of the yeast, that is, in amounts of from 0.25 up to about 27 percent for sweet doughs, although excessive sugar is of course not detrimental.

The percentages given above are on a dry weight basis.

The following examples will illustrate the preparation and use of the compositions of the present invention.

*Example 1*

This example illustrates the use of commercial flour of low moisture content in the compositions of this invention, as compared with high moisture flour. The pre-mix composition was adjusted to approximately 15 percent gluten content on a dry weight basis by the addition of vital wheat gluten. Table I shows the formulations of these compositions.

dough into a cylindrical shape to fit a standard bread baking pan. The pan containing the dough is transferred to a proof cabinet, and the time (proof time) required for the dough to rise approximately three-quarters inch above the top of the pan is noted (volume of dough about 1800 cc.).

TABLE II.—EFFECT OF FLOUR MOISTURE ON PROOF TIME OF PRE-MIXES DURING PROLONGED STORAGE

| Exposure conditions | Bake shop | | | Cyclic | |
|---|---|---|---|---|---|
| Formulation | A | B | C | A | B |
| Type pouch [1] | H | N | H | N | H | H | H |
| Moisture percent (flour) | 8 | 8 | 9.6 | 9.6 | 12.3 | 8 | 9.6 |
| Proof time in minutes | | | | | | | |
| Exposure time (weeks): | | | | | | | |
| 0 | 67 | 67 | 58 | 58 | 60 | 67 | 58 |
| 6 | 77 | 65 | 70 | 68 | 92 | --- | --- |
| 12 | 77 | 70 | 83 | 80 | 123 | 78 | 73 |
| 20 | 90 | 83 | 108 | 95 | [2] 204+ | 80 | 75 |
| Minutes increase in proof time in in 20-week period | 23 | 16 | 50 | 37 | [2] 144+ | 21 | 33 |

[1] H: Hermetic pouches. N: Non-hermetic pouches.
[2] Did not rise to test volume.

The above table illustrates that there is a substantial improvement in the stability of proof times of pre-mix compositions made in accord with this invention as compared to pre-mix compositions prepared from high moisture flour. Exposure under bake shop temperatures appears to be slightly more severe than under cyclic cham-

TABLE I.—FORMULATION OF PRE-MIX COMPOSITIONS

| Type formulation | A | | B | | C | |
|---|---|---|---|---|---|---|
| Type flour | Cake | | Bread | | Bread | |
| Composition ingredient | Grams | Percent | Grams | Percent | Grams | Percent |
| Flour | [1] 334 | 75.1 | [2] 363 | 80.0 | [3] 383 | 82.7 |
| Gluten [4] | 48 | 10.8 | 28 | 6.2 | 17 | 3.7 |
| NFDMS [5] | 16 | 3.6 | 16 | 3.5 | 16 | 3.5 |
| Sugar | 16 | 3.6 | 16 | 3.5 | 16 | 3.5 |
| Salt | 8 | 1.8 | 8 | 1.8 | 8 | 1.7 |
| Shortening | 12 | 2.7 | 12 | 2.6 | 12 | 2.6 |
| ADY [6] | 10.7 | 2.4 | 10.7 | 2.4 | 10.7 | 2.3 |
| Total [7] | 444.7 | 100 | 453.7 | 100 | 462.7 | 100 |
| KBrO$_3$ (mg.) | 30 | | 30 | | 30 | |

[1] 8% moisture, 9.5% gluten.
[2] 9.6% moisture, 13.4% gluten.
[3] 12.3% moisture, 15.3% gluten.
[4] Vital wheat gluten: 6.2% moisture, 17.5% starch, 75.9% gluten.
[5] NFDMS: Non-fat dry milk solids.
[6] Stabilized active dry yeast: 0.1% butylated hydroxyanisole, 6% moisture (U.S. Patent No. 3,041,249).
[7] Total moisture less than 10% in compositions A and B. Total moisture in composition C was about 11%.

Table II illustrates the effect of flour moisture content on the three formulations (A, B, C) given in Table I, when stored in hermetic pouches (aluminum polyethylene laminate) and non-hermetic pouches (2.5 mil polyethylene) under ambient bake shop conditions [95° F. during "baking" hours (8 hours), 80° F. during "off" hours]. Cyclic chamber tests were also conducted with alternating 12 hour periods of 75 and 90° F. The activity of the pre-mixes when fresh and after storage for the indicated periods were determined by the time required for a 1-pound dough piece to rise to a predetermined volume (about 1800 cc.) under equivalent controlled conditions, and is expressed as "proof time" in minutes. In each case, the doughs were produced by simply adding an appropriate amount of 90° F. water to the pre-mix, mixing to form a bread dough of proper consistency, scaling the dough to a 1-pound mass, and hand molding the weighed ber temperatures. Since the latter temperatures are generally considered as typical of "semi-tropical" conditions, it is readily apparent that the pre-mix compositions of this invention have excellent shelf life.

*Example 2*

This example illustrates the comparison of results obtained by the use of conventional active dry yeast and stabilized active dry yeast of the type described in the Chen and Cooper Patent No. 3,041,249 in the pre-mix compositions of this invention. Table III shows the formulation of two pre-mix compositions. The yeasts used in each composition are identified in Table IV, which shows the proof time of the pre-mix after various periods of aging in the bake shop. Each pre-mix was sealed in hermetic packages during storage.

TABLE III.—FORMULATIONS OF PRE-MIXES USED TO DETERMINE THE RELATIVE STABILITY OF COMMERCIAL ADY AND STABILIZED ADY

| Pre-mix formulas | D | | E | |
|---|---|---|---|---|
| Flour type | Bread | | Cake | |
| Flour, percent moisture | 9.2 | 7.2 | 9.3 | 7.6 |
| Flour, percent gluten | 13.4 | 13.4 | 9.5 | 9.5 |
| Flour weight, g | 372 | 371 | 355 | 354 |
| Vital wheat gluten, g. (Hi vol.)[1] | 28 | 29 | 45 | 46 |
| Nonfat dry milk solids, g | 16 | 16 | 16 | 16 |
| Sugar, g | 16 | 16 | 16 | 16 |
| Salt, g | 8 | 8 | 8 | 8 |
| Shortening, g | 12 | 12 | 12 | 12 |
| $KBrO_3$, mg | 30 | 30 | 30 | 30 |
| ADY, g.[2] | 10 | 10 | 10 | 10 |

[1] Sufficient vital wheat gluten added to each flour to adjust combined protein content to 18% on a moisture-free solids basis. Combined weight of flour and gluten was 400 grams.
[2] Each of the above formulas tested with each of the following ADY's as an integral part of the pre-mix: Commercial active dry yeast dried to a low moisture content; commercial active dry yeast dried to a normal moisture content (7.5 to 8.5%); stabilized active dry yeast containing 0.1% butylated hydroxyanisole (Chen and Cooper U.S. Patent No. 3,041,249).

TABLE IV.—RELATIVE STABILITY OF STABILIZED AND REGULAR ACTIVE DRY YEAST UNDER PRE-MIX CONDITIONS

| Type formula | D | | E | |
|---|---|---|---|---|
| Type flour | Bread | | Cake | |
| Exposure interval (weeks) | ADY | Percent moisture | | Percent moisture |
| | Type | Percent moist. | 9.2 | 7.2 | 9.3 | 7.6 |
| | Proof time, minutes | | | | | |
| 0 | (1) | 4.5 | 47 | 49 | 44 | 47 |
|   | (2) | 5.6 | 48 | 68 | 48 | 67 |
|   | (3) | 8.4 | 51 | 64 | 49 | 63 |
| 6 | (1) | 4.5 | 54 | 58 | 56 | 55 |
|   | (2) | 5.6 | 64 | 80 | 61 | 80 |
|   | (3) | 8.4 | 65 | 85 | 61 | 82 |
| 10 | (1) | 4.5 | 67 | 60 | 62 | 62 |
|    | (2) | 5.6 | 83 | 129 | 86 | 141 |
|    | (3) | 8.4 | 84 | 127 | 87 | 148 |
| 16 | (1) | 4.5 | 84 | 73 | 82 | 76 |
|    | (2) | 5.6 | 126 | 175 | 132 | 211 |
|    | (3) | 8.4 | 121 | 179 | 128 | 206 |
| 20 | (1) | 4.5 | 97 | 79 | 90 | 73 |
|    | (2) | 5.6 | 147 | (4) | 162 | (4) |
|    | (3) | 8.4 | 156 | (4) | 157 | (4) |

[1] Stabilized active dry yeast—0.1% butylated hydroxyanisole (Chen and Cooper U.S. Patent No. 3,041,249).
[2] Commercial active dry yeast dried to a low moisture content.
[3] Commercial active dry yeast.
[4] Bake tests abandoned—proof times too long to be of significance.

The foregoing example illustrates the stability of pre-mixes containing various types of active dry yeast. The proof times of pre-mixes containing low moisture flour and stabilized active dry yeast are still in a very practical range even after 20 weeks' storage. Those pre-mixes containing normal or low moisture conventional active dry yeast show substantial deterioration after only a 10 week storage period, even in hermetically sealed packages. The initial moisture content of regular commercial active dry yeast has no apparent effect on storage stability.

It has also been found that the pre-mix compositions of the present invention may be used under a wide variety of conditions in the mixing or dough forming operation. For example the conventional use of active dry yeast requires separate rehydration of the active dry yeast using water at a temperature of from about 90 to 110° F. The pre-mix composition of the present invention is mixed directly with water at temperatures of from 50 to 140° F. without adverse effect on proof time and bread characteristics.

It should be noted that in all of the foregoing examples, the single rise (no floor time) proof technique was utilized. In each case the pre-mix compositions were mixed with water to form a dough which was weighed and immediately formed into loaves and permitted to proof or rise to final volume before baking. This procedure lends itself well to home baking or small bake shops where convenience and a "foolproof" procedure are a particular asset. In the case of commercial and institutional bakeries, where time and handling costs are at a premium, it can provide substantial monetary savings.

It should also be understood, however, that conventional procedures may also be employed with these pre-mix compositions wherein, after mixing, the dough is permitted to rise one or more times prior to weighing and forming into loaves and again permitted to proof to the desired volume prior to baking.

As indicated above, the pre-mix compositions of this invention may be modified in a variety of ways to produce a broad spectrum of yeast leavened products. For example, the formulas as illustrated within this disclosure would be suitable for the production of bread, rolls, buns, and pizza crusts and the like, notwithstanding that the gluten content could be adjusted in accord with resired product characteristics and/or nutritive value. The composition of the formula with respect to other constituents could likewise be modified in keeping with the type of product desired. For example, additional sugar can be used to produce a sweet dough suitable for coffee cakes, doughnuts, Danish pastry, or other bakery products.

The following are examples of specific yeast leavened pre-mix products prepared in accordance with the present invention exemplifying a pre-mix unfortified by the addition of gluten, a high protein bread pre-mix, and "sweet dough" products.

*Example 3.—Pre-mix formula for bread and similar baked goods not containing added vital wheat gluten*

| Ingredient | Weight (grams) | Percent |
|---|---|---|
| Flour [1] | 400 | 100 |
| NFDMS [2] | 16 | 4 |
| Sugar | 16 | 4 |
| Salt | 8 | 2 |
| Shortening | 12 | 3 |
| ADY [3] | 10 | 2½ |
| Water | 300 | 75 |
| $KBrO_3$ | (30 mg.) | (75 p.p.m.) |

[1] Bread type: 7.3% moisture, 13.4% gluten.
[2] NFDMS: Non-fat dry milk solids.
[3] Stabilized active dry yeast: 0.1% butylated hydroxyanisole, 6.0% moisture (U.S. Patent No. 3,041,249).

The bread produced by this composition was of satisfactory quality.

*Example 4.—Pre-mix formula for bread and similar baked goods containing added vital wheat gluten*

[Final gluten level=26%]

| Ingredient | Weight (grams) | Percent |
|---|---|---|
| Flour [1] | 320 | 80 |
| Gluten [2] | 80 | 20 |
| NFDMS [3] | 16 | 4 |
| Sugar | 16 | 4 |
| Salt | 8 | 2 |
| Shortening | 12 | 3 |
| ADY [4] | 10 | 2½ |
| Water | 308 | 77 |
| $KBrO_3$ | (30 mg.) | (75 p.p.m.) |

[1] Bread flour: 7.3% moisture, 13.4% gluten.
[2] Vital wheat gluten: 6.2% moisture, 75.0% gluten.
[3] NFDMS: Non-fat dry milk solids.
[4] Stabilized active dry yeast: 0.1% butylated hydroxyanisole, 6% moisture (U.S. Patent No. 3,041,249).

The baking procedure was essentially as previously outlined. The proof time was 51 minutes and the bread volume was 2300 cc. The bread was rated as having excellent characteristics—comparable to the best commercial type breads. It should be noted that the level to which the gluten was adjusted was in excess of that needed to produce highly acceptable bread for either home or commercial purposes. It was chosen as an example whereby the protein content of bread was approximately doubled—producing a product having substantially increased nutritive value.

*Example 5.—Pre-mix formulas for baked sweet goods*

The number of practical formulas for the production of baked sweet goods products are virtually unlimited. Three such formulas are shown below. These would be recognized by the baking industry as being typical for what is known as "lean," "medium" and "rich" sweet doughs, which generally covers the broad spectrum for such products. The principal difference in formulation is in the levels of sugar, shortening, eggs, and milk solids.

COMPOSITION OF SWEET DOUGH FORMULAS

| Type formula | Lean | | Medium | | Rich | |
|---|---|---|---|---|---|---|
| Ingredient level [1] | Grams | Percent | Grams | Percent | Grams | Percent |
| Ingredient: | | | | | | |
| Bread flour [2] | 320 | 80 | 320 | 80 | 320 | 80 |
| Cake flour [3] | 80 | 20 | 80 | 20 | 80 | 20 |
| Total flour | 400 | 100 | 400 | 100 | 400 | 100 |
| NFDMS [4] | 8 | 2 | 16 | 4 | 24 | 6 |
| Sugar | 40 | 10 | 64 | 16 | 80 | 20 |
| Salt | 6 | 1.5 | 6 | 1.5 | 6 | 1.5 |
| Dried whole egg | 5 | 1.25 | 10 | 2.5 | 20 | 5 |
| Shortening | 40 | 10 | 60 | 15 | 80 | 20 |
| ADY [5] | 14 | 3.5 | 14 | 3.5 | 16 | 4 |
| Water | 248 | 62 | 224 | 56 | 210 | 52 |
| $KBrO_3$ (mg.) | (30) | | (30) | | (30) | |

[1] Percent level of ingredients based on total flour weight.
[2] 9.2% moisture, 13.5% gluten.
[3] 9.3% moisture, 10.4% gluten.
[4] NFDMS: Non-fat dry milk solids.
[5] Stabilized active dry yeast: 0.1% butylated hydroxyanisole, 6% moisture (U.S. Patent No. 3,041,249).

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

We claim:

1. A pre-mix for yeast leavened bakery products having an extended storage life comprising in an admixture flour having a moisture content of up to about 10% and an effective amount of a stabilized active dry yeast containing a compound selected from the group consisting of butylated hydroxyanisole, butylated hydroxytoluene and propyl gallate, and having a moisture content of up to about 6%, the said pre-mix having a total aggregate moisture content of up to about 10% and a gluten content of at least 5%, said percentages being expressed on a total pre-mix dry weight basis.

2. A pre-mix composition according to claim 1 wherein the stabilized active dry yeast is present in an amount of from ½ to 4½ percent.

3. A pre-mix composition according to claim 1 wherein the stabilized active dry yeast is present in an amount of from ½ to 4½ percent.

4. A pre-mix composition according to claim 1 wherein the stabilized active dry yeast is present in an amount of from 1½ to 4½ percent.

5. A pre-mix composition according to claim 1 containing flour oxidizers selected from the group consisting of potassium bromate, potassium iodate, calcium bromate and calcium iodate.

6. A pre-mix composition according to claim 1 wherein the aggregate gluten content is at least 13.5 percent.

7. A pre-mix composition according to claim 1 wherein the aggregate gluten content is at least 13.5% and the stabilized active dry yeast is present in an amount of from 1½ to 4½ percent.

References Cited by the Examiner

UNITED STATES PATENTS

| | | | |
|---|---|---|---|
| 2,215,957 | 9/1940 | Freilich et al. | 99—90 |
| 2,523,483 | 9/1950 | Stern | 99—96 X |
| 2,842,442 | 7/1958 | Jeffreys | 99—90 |
| 2,969,289 | 1/1961 | Matz et al. | 99—90 |
| 3,041,249 | 6/1962 | Chen et al. | 195—57 X |
| 3,096,178 | 7/1963 | Tucker | 99—94 |

FOREIGN PATENTS 792,271   3/1958   Great Britain.

OTHER REFERENCES

Baker, "American Miller and Processor," vol. 71, No. 1, Jan. 1948, pages 78 to 82 relied upon.

A. LOUIS MONACELL, *Primary Examiner.*
RAYMOND N. JONES, *Examiner.*